United States Patent [19]
Sink et al.

[11] 3,939,951
[45] Feb. 24, 1976

[54] DIAPHRAGM CLUTCH SPRING HAVING RADIAL AND ROTATIONAL RESTRAINTS

[75] Inventors: William Howard Sink, Auburn; Richard Allen Flotow, Fort Wayne, both of Ind.

[73] Assignee: Dana Corporation, Toledo, Ohio

[22] Filed: Dec. 23, 1974

[21] Appl. No.: 535,338

[52] U.S. Cl. .............................. 192/89 B; 192/70.18
[51] Int. Cl.² .......................................... F16D 13/71
[58] Field of Search ............ 192/89 B, 70.18, 70.27

[56] References Cited
UNITED STATES PATENTS

| | | | |
|---|---|---|---|
| 2,138,169 | 11/1938 | Hunt................................ | 192/70.27 |
| 2,169,787 | 8/1939 | Becker............................. | 192/70.27 |
| 3,283,864 | 11/1966 | Motsch............................. | 192/89 B |
| 3,595,355 | 7/1971 | Maucher........................... | 192/89 B |

FOREIGN PATENTS OR APPLICATIONS

| | | | |
|---|---|---|---|
| 2,132,730 | 1/1972 | Germany........................... | 192/89 B |

Primary Examiner—Benjamin W. Wyche
Attorney, Agent, or Firm—Robert E. Pollock

[57] ABSTRACT

A diaphragm spring is maintained in concentric relation with the clutch axis by integral support means formed on the clutch cover member. The diaphragm spring has a plurality of openings and the integral support means includes circumferentially spaced tang portions extending axially from the cover through certain of the openings and circumferentially spaced tab portions extending axially from the cover through other of the openings in the diaphragm spring. The tang and tab portions engage the openings in such a manner as to prevent both relative radial movement between the diaphragm spring and cover and relative rotational movement therebetween.

1 Claim, 4 Drawing Figures

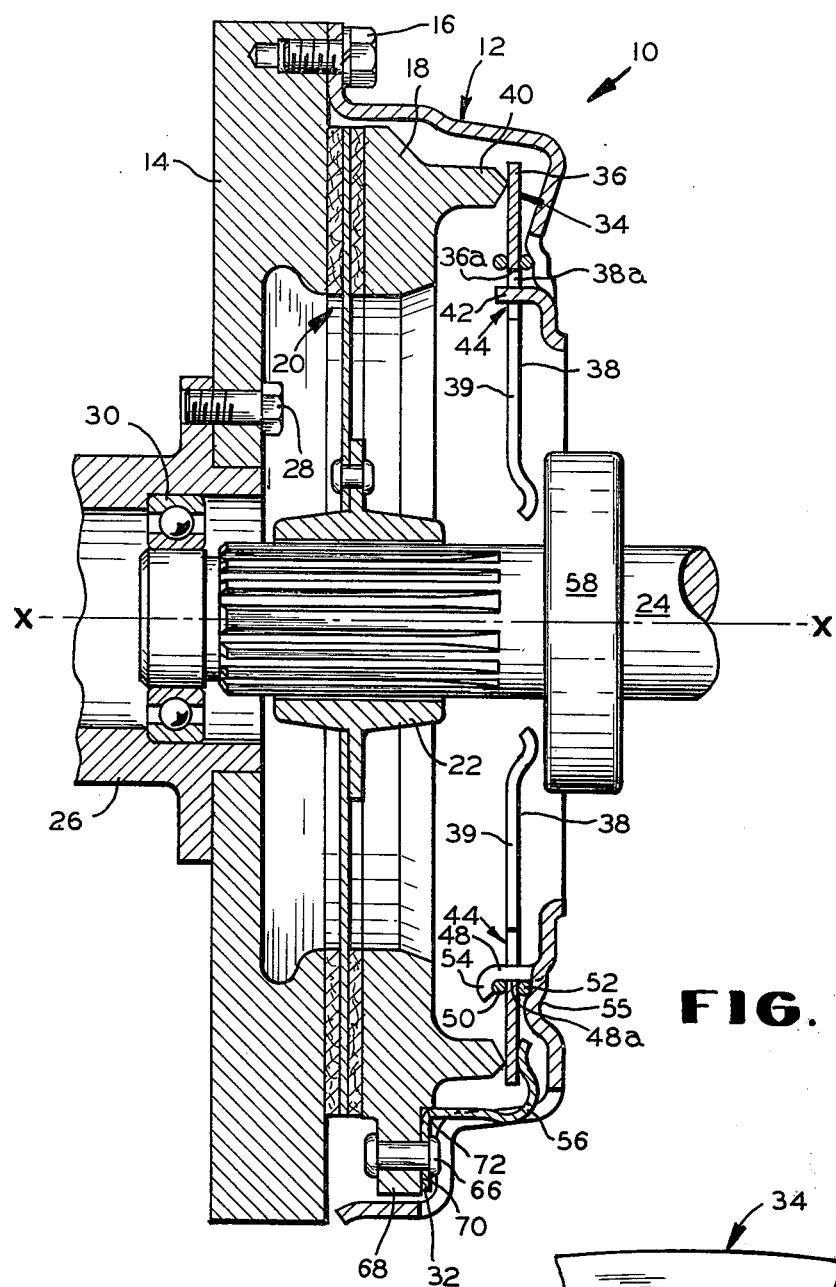
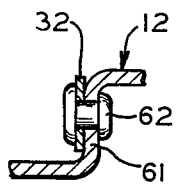
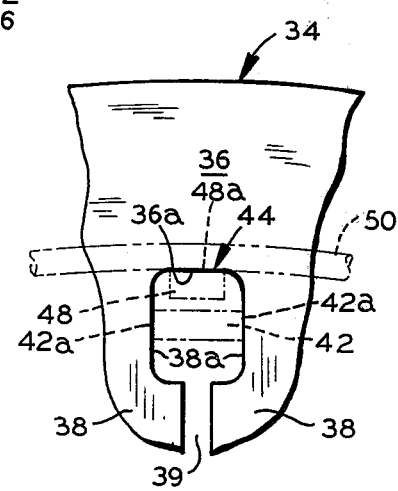
FIG. 2
FIG. 3
FIG. 4

DIAPHRAGM CLUTCH SPRING HAVING RADIAL AND ROTATIONAL RESTRAINTS

BACKGROUND OF THE INVENTION

The present invention relates to friction clutches in general and more specifically to diaphragm type friction clutches.

Diaphragm type friction clutches have found wide acceptance in the automotive industry over the years due to the fact that they require considerably less axial space than other types of friction clutches. The reduced axial length results from the combined use of a flat dished-shaped diaphragm spring for engaging and disengaging the clutch and flat radially disposed resilient straps for providing the necessary drive and axial flexibility to permit the engaging disengaging operation to take place.

One well known friction clutch of this type is shown in U.S. Pat. No. 2,770,341 which issued Nov. 13, 1956 to M. T. Woobrock. In such a clutch, the diaphragm spring is normally supported with respect to the clutch cover by a plurality of fastening means, such as rivets, which are secured to the cover and pass through openings in the diaphragm spring. A fulcrum ring is positioned on opposite sides of the diaphragm spring and supported and positioned by these same rivets so that the spring can be pivotally operated in either direction to control operation of the clutch.

Although this arrangement has proved satisfactory in the past, problems have been encountered in present day applications due to the continually increasing rotational speeds which have produced centrifugal effects sufficient to cause displacement of the diaphragm spring and/or associate fulcrum rings. In a drive system where balance is a finely controlled factor, it can be seen that any such displacement will result in unbalance thereby setting up vibrations and subsequent problems in the vehicle drive line. At initial assembly, the clutch is balanced and the diaphragm spring and fulcrum rings are concentrically located with respect to their support means. However, it has been found that during shipping and also prior to final assembly in a vehicle this balanced condition is sometimes altered due to accidental or careless handling by a worker.

Efforts have recently been directed to providing a more satisfactory support means for the fulcrum rings so that they are prevented from rotating relative to the diaphragm spring or the clutch cover. The former method is shown in British Pat. No. 1,003,406, published Sept. 2, 1965 and the latter in U.S. Pat. No. 3,595,355 which issued July 27, 1971 to P. Maucher. While both designs may be sufficient to restrain the fulcrum rings in their initially assembled and balanced condition, the diaphragm spring in each design is still susceptible to relative movement with respect to the fastening means and thereby the cover since the diaphragm springs are movable with respect to the fastening means due to spacing resulting from the construction of the openings. It will be evident that if the diaphragm spring is not positively constrained in all directions by the fastening means it is subject to radial and/or rotational displacement relative to the cover under the influence of centrifugal force or possibly as a result of accidental dropping or mishandling.

Some very early arrangements have been disclosed which tend to approach a much more satisfactory design and, while somewhat reducing this problem, they have not completely eliminated all possibilities. One design is disclosed in U.S. Pat. No. 2,138,169 which issued on Nov. 29, 1938 to G. Hunt. Another arrangement is shown in U.S. Pat. No. 2,256,708 which issued to H. S. Geyer et al. on Sept. 23, 1941. The latter design illustrates the use of fastening means on the cover for cooperating with openings in the diaphragm spring to prevent rotational displacement of the diaphragm spring with respect to the cover but does not show any means to prevent relative radial displacement therebetween. In this particular patent an annular fulcrum member is provided with a plurality of axial tongues which extend through the openings in the diaphragm spring with the ends of the tongues secured to the cover so as to rigidly secure the fulcrum member to the cover. The width of the tongues is such as to engage the side walls of the openings thereby preventing relative rotation between the cover and diaphragm spring. The former design illustrates, in one embodiment, integral axial lugs on the cover extending through openings in the diaphragm spring and supporting a pair of fulcrum rings. However, neither of these designs show any type of means for positively maintaining the diaphragm spring radially centered with respect to the cover and thereby concentric with the clutch axis.

In clutches of this type, for the reasons pointed out earlier, it is essential that the diaphragm spring be initially located and subsequently maintained in concentric relationship with respect to the clutch axis in order to maintain proper balance and operation throughout the life of such a clutch.

Accordingly, it is an object of the present invention to provide integral support means on a clutch cover which will positively prevent both radial and rotational movement of a diaphragm spring with respect to the clutch cover under all handling and operating conditions.

Another object of this invention is to integral means on a clutch cover which will serve to prevent axial and radial displacement of the fulcrum rings employed in a diaphragm clutch.

SUMMARY OF THE INVENTION

The above and further objects of this invention are achieved by constructing a series of circumferentially spaced integral means on a cover member which are adapted to extend axially through and cooperate with suitable openings in the diaphragm spring. The openings are formed so that the integral means on the cover member cooperate with flat wall portions of the openings to positively constrain the diaphragm spring in concentric relation with respect to the cover. In addition, certain of the integral means serve as supports for a pair of continuous fulcrum rings positioned on opposite sides of the diaphragm spring. Further, a strap drive connection is utilized for connecting the clutch cover to a pressure plate with an integral spring clip construction on one end of each of the straps adapted to engage and thereby hold the diaphragm spring in contact with the pressure plate.

BRIEF DESCRIPTION OF THE DRAWINGS

While the specification concludes with claims which particularly point out and distinctly claim the subject matter forming the present invention, it is believed that the same will be better understood and other objects and features of this invention will become more apparent from the following description and accompanying drawings in which:

FIG. 2 is a cross-sectional view taken along line 2—2 of FIG. 1;

FIG. 3 is a partial cross-sectional view taken along line 3—3 of FIG. 1; and

FIG. 4 is an enlarged partial view showing the construction of one of the openings in the diaphragm spring.

DESCRIPTION OF THE PREFERRED EMBODIMENT

Figure 1:
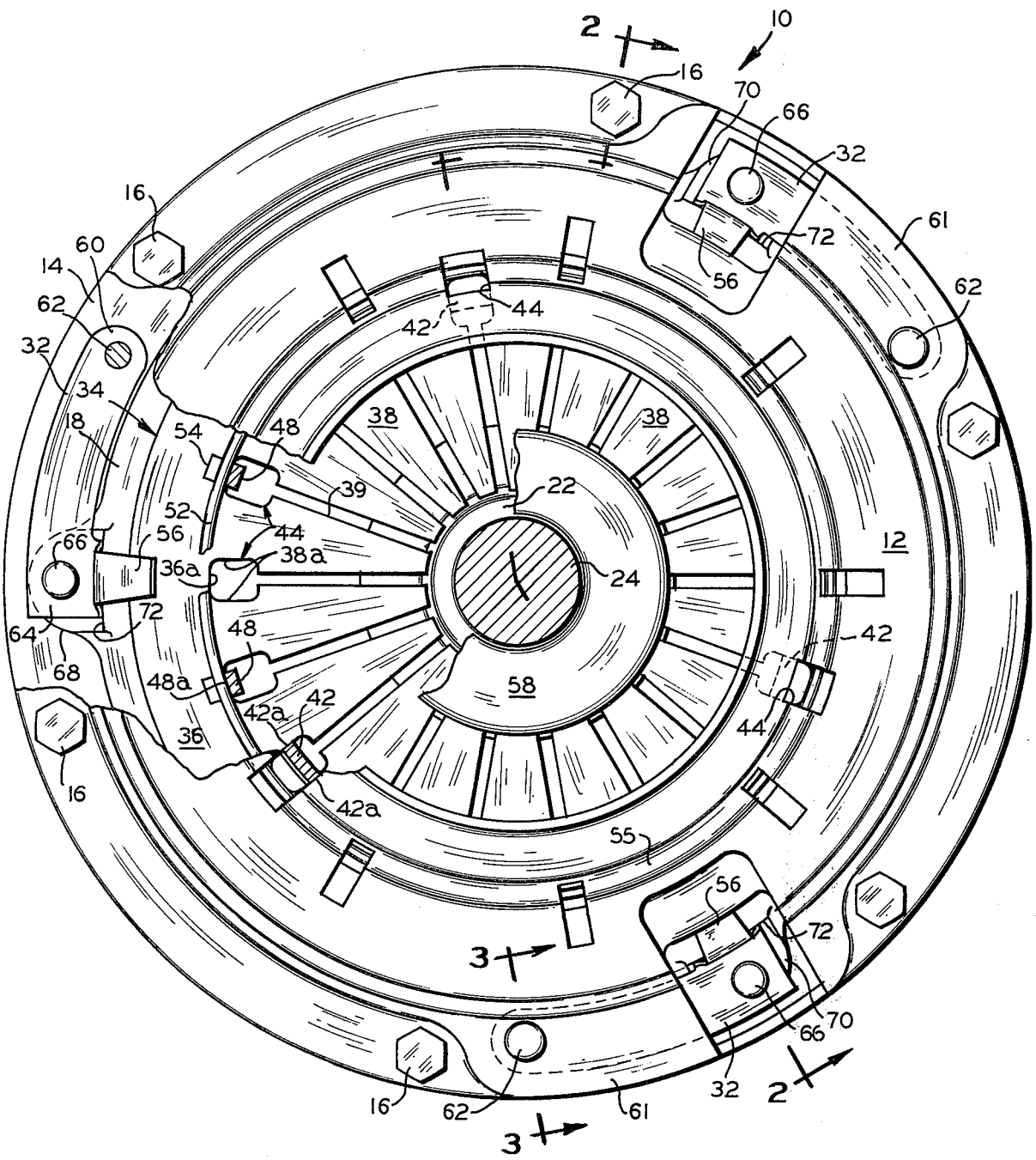
FIG. 1 is an end elevational view of the clutch of the present invention with parts broke away to more clearly show certain portions thereof.

The diaphragm clutch of the present invention is indicated generally by the reference numeral 10. The clutch 10 includes an annular clutch cover 12 secured to the periphery of a standard flywheel 14 by a plurality of circumferentially spaced bolts 16. An annular pressure plate 18 is disposed within the cover 12 for cooperating with a driven member in the form of a friction disc assembly 20. The friction disc assembly 20 has a central hub 22 splined to the outer end of a transmission input shaft 24 for rotation therewith and axial movement relative thereto. As shown, the transmission input shaft 24 is arranged co-axial with an engine crankshaft 26 which is secured to the flywheel 14 by bolts 28. The end of the transmission input shaft 24 is piloted within the crankshaft 26 by means of a bearing assembly 30.

As is known, the pressure plate 18 is axially movable into engagement with the friction disc assembly 20 to force the same into frictional drive engagement with the flywheel 14 for transmitting power from the engine crankshaft 26 to the transmission input shaft 24. The pressure plate 18 is floatingly supported within and driven by the cover 12 by a plurality of arcuate circumferentially spaced drive straps 32. The drive strap connection will be described in greater detail subsequently.

A diaphragm spring designated generally by the numeral 34 is provided for applying an axial engaging force to the pressure plate 18 to normally urge the same into engagement with the friction disc assembly 20 and also provide for disengagement of the pressure plate 18 from the friction disc assembly 20.

More specifically, the diaphragm spring 34 is generally annular in configuration and comprises a peripheral ring-shaped main spring bearing portion 36 and a plurality of radially inwardly extending tapered spring-like levers 38 defined by radial slots 39. The diaphragm spring 34 is of a spring steel with the bearing portion 36 disposed to bear against an annular axial boss 40 on the back face of the pressure plate 18. The bearing portion 36 is deformed so that it will always exert a pressure force on the annular boss 40 to urge the pressure plate towards its engaged position, i.e., to the left as viewed in FIG. 2. As best seen in FIG. 1, series of openings 44 is formed in the spring 34 adjacent the bearing portion 36 and between each lever 38; i.e. at the radial extremity of the slots 39. Referring to FIG. 4, the openings 44 are such as to provide a pair of radially extending spaced side walls 38a—38a adjacent the levers 38 and a connecting wall 36a along the inner surface of the bearing portion 36 and perpendicular to a radius through the middle of the adjacent slot 39. The walls are substantially flat in their respective directions and have radiused corners therebetween for production purposes.

A support means is constructed on the cover 12 for cooperating with the diaphragm spring 34 to concentrically locate the same with respect to the clutch axis X—X. The support means includes radial and rotational preventing means engageable with the diaphragm spring 34 so as to eliminate any relative movement between the diaphragm spring and the cover 12. To this end the rotational preventing means consists of a plurality of circumferentially spaced tangs 42 stamped from the cover 12 so as to extend axially inwardly toward the flywheel 14 through the openings 44 and spaced between the radial extremities thereof. Preferably, at least three equally spaced tangs 42 are provided for this purpose. As viewed in FIG. 1 and 4, the width of the tangs 42 is such as to equal the distance between the side walls 38a—38a of the openings 44 so that the sides 42a—42a of the tangs 42 engage the sidewalls 38a—38a. This engagement serves to prevent any relative rotation (circular movement) between the diaphragm spring 34 and cover 12.

The means for preventing radial movement from occurring between the diaphragm spring 34 and cover 12 consists of a plurality of circumferentially spaced tabs 48 adapted to extend axially through certain other of the openings 44. The width of each tab 48 is less than the distance between the side walls 38a—38a of the openings 44 and designed in such a manner as to have an outer surface 48a in flush engagement with the flat outer wall 36a of the openings 44 in the area located between the radiused corner surfaces. As most clearly shown in FIG. 2, these tabs 48 are of sufficient axial length so as to extend beyond the diaphragm spring 34 and provide space for reception of a pair of annular fulcrum rings 50–52 on opposite sides of the diaphragm spring 34. The pair of fulcrum rings 50 and 52 extend circumferentially about the central axis X—X of the clutch assembly 10 and are disposed around and supported on the tabs 48. The outer fulcrum ring 52 bears against the inside surface of the cover 12 and the outside surface of the diaphragm spring 34 and serves as a pivot for the diaphragm spring 34 as it moves from its disengaged position to its engaged position. The inner fulcrum ring 50 bears against the opposite surface side of the diaphragm spring 34 and is retained in this position by a first retention means in the form of a radially outwardly extending lip portion 54 formed on the inner end of the tab 48. The fulcrum ring 50 serves a pivot for the diaphragm spring 34 as it moves from its engaged to its disengaged position.

Additional retention means is formed on the cover 12 adjacent the outer fulcrum ring 52 for engaging and holding the fulcrum ring 52 on the outer surface 48a of the tabs 48. For this purpose an annular indentation 55 is formed on the cover 12 outwardly of the tabs 48 and of sufficient depth as to displace a portion of the cover 12 partially over the fulcrum ring 52. The reverse lip portion 54 on the tabs 48 is also rolled over sufficiently so as to partially overlie the fulcrum ring 50. The indentation 55 on the cover 12 and the reverse lip 54 on the tabs 48 embrace the fulcrum rings 50 and 52 and thereby function as means to restrict in and out axial movement of the diaphragm spring 34 with respect to the tabs 48.

To force the pressure plate 18 axially away from the flywheel 14 into its disengaged position in response to pivotal movement of the diaphragm spring 34, a plurality of spring clips 56 are provided which are conveniently constructed as an integral part of the pressure plate end of the drive straps 32 and engage the periphery of the spring portion 36 of the diaphragm spring. By this arrangement as viewed in FIG. 2, leftward movement of the inner ends of the levers 38 by a conventional clutch release bearing 58 will pivot the diaphragm spring 34 about the inner fulcrum ring 50. This pivotal movement causes the outer end of the diaphragm spring 34, by means of the spring clip 56, to lift the pressure plate 18 axially away from the flywheel 14 out of engagement with the friction disc assembly 20. This movement serves to interrupt the drive connection between the crankshaft 26 and transmission input shaft 24.

The drive means here shown consists of three equally spaced arcuately shaped resilient drive straps 32 having one end 60 secured to a stepped rim portion 61 on the cover 12 by means of a rivet 62 as seen in FIG. 3. The opposite ends 64 of the straps 32 are fastened by rivets 66 to radially outwardly extending bosses 68 formed on the periphery of the pressure plate 18. The resiliency of the drive straps 32 is such as to support and center the pressure plate 18 with respect to the clutch axis X—X and also permit the necessary axial flexibility for engaging and disengaging the pressure plate 18 from friction disc assembly 20.

A mounting connection is provided at the end 64 of the drive strap 32 which is sufficient to prevent any relative rotational movement from occurring between the rivet 66 and drive strap 32. To this end a flat seat 70 is machined in the outer surface of the boss 68 which forms a wall 72 contoured so as to abutingly engage along the entire surface of the right-angled axial extension of the clip 56.

It will be readily apparent from the foregoing that the spacing of the radial and rotational support means 48 and 42 respectively and their cooperation with the various wall portions of the openings 44 provides an improved diaphragm type friction clutch wherein the diaphragm spring 34 is positively contained in a concentric position with respect to the central axis X—X of the clutch 10.

While this invention has been described by reference to a single embodiment, it should be apparent that variations of the inventive concepts disclosed are possible without departing from the principles of the invention.

What is claimed is:

1. In a clutch the combination comprising:
   a. a rotatable flywheel;
   b. a cover secured to said flywheel for rotation therewith;
   c. an axially movable driven member positioned adjacent said rotatable flywheel and movable into driving engagement therewith;
   d. an axially movable pressure plate disposed between said cover and said driven member for engaging said driven member with said flywheel;
   e. resilient strap means drivingly connecting said pressure plate to said cover and permitting relative axial movement therebetween;
   f. a diaphragm spring disposed between said cover and pressure plate having an annular bearing portion engaging said cover and said pressure plate to move the latter into engagement with said driven member and a plurality of integral radially inwardly extending levers defined by radial slots in said spring operable to move said spring out of contact with said pressure plate;
   g. a series of spaced openings formed in said diaphragm spring and at the radial extremity of said slots and adjacent said bearing portion of said spring, each opening defining a pair of flat, radially extending side walls on said levers and a flat, outer horizontally extending connecting wall adjacent the radially inward edge of said bearing portion, said side walls being connected to said outer wall by radiused corners;
   h. axially extending radial supporting means integral with said cover, extending through certain of said spaced openings and having a flat, circumferentially extending surface engaging said flat, outer, horizontally extending connecting wall between said radiused corners for preventing relative radial movement between said cover and said diaphragm spring; and
   i. axially extending rotational support means integral with said cover, located radially inwardly of said radial support means, extending through certain other of said spaced openings and extending across said openings from one of said side walls to the other of said side walls and having flat radial side edges engaging said pair of flat side walls on said levers for preventing relative rotational movement between said cover and said diaphragm spring.

* * * * *